United States Patent [19]

Sogge et al.

[11] Patent Number: 5,280,926
[45] Date of Patent: Jan. 25, 1994

[54] SEAL APPARATUS FOR PRESSURE RESPONSIVE ELECTRICAL SWITCH

[75] Inventors: Dale R. Sogge, Wrentham; Karl H. Werner, North Attleboro, both of Mass.

[73] Assignee: Texas Instruments Incorporated, Dallas, Tex.

[21] Appl. No.: 913,510

[22] Filed: Jul. 14, 1992

[51] Int. Cl.$^5$ .............................................. F16J 15/56
[52] U.S. Cl. .................................. 277/168; 277/170; 200/302.1; 200/302.2
[58] Field of Search ................. 277/23, 152, 168, 169, 277/170; 200/83 P, 83 J, 83 N, 83 B, 83 Y, 302.1, 302.2, 302.3

[56] References Cited

U.S. PATENT DOCUMENTS

| | | | |
|---|---|---|---|
| 3,206,216 | 9/1965 | Crook | 277/23 |
| 3,340,774 | 9/1967 | Brenneke | 277/170 X |
| 3,831,951 | 8/1974 | Patel et al. | 277/170 |
| 4,827,094 | 5/1989 | Tanaka et al. | 200/83 J |
| 5,015,808 | 5/1991 | Czarn et al. | 200/83 P |
| 5,049,708 | 9/1991 | Baker | 200/83 J X |

FOREIGN PATENT DOCUMENTS

| | | | |
|---|---|---|---|
| 1004443 | 5/1957 | Fed. Rep. of Germany | 277/169 |
| 774032 | 5/1957 | United Kingdom | 277/169 |
| 1218480 | 1/1971 | United Kingdom | 200/302.2 |

*Primary Examiner*—William A. Cuchlinski, Jr.
*Assistant Examiner*—Scott W. Cummings
*Attorney, Agent, or Firm*—Russell E. Baumann; Richard L. Donaldson; René E. Grossman

[57] ABSTRACT

A normally open pressure responsive electrical switch is shown having upper and lower body members with a combination terminal and disc seat member sandwiched therebetween. An electrically conductive snap acting disc is disposed on the disc seat and is adapted to snap through a centrally disposed aperture in the terminal into electrical engagement with an electrical contact disposed on a terminal mounted in the lower body member. The upper body member has a bore extending therethrough which slidably mounts a pressure converter adapted to convert pressure from a pressure source to a force and apply the force to the disc. A flexible membrane is disposed over the bore with an O-ring received on an O-ring seat adjacent the bore in the upper body member. A wall extending around the seal seat is deformed to capture the O-ring at its seat.

9 Claims, 2 Drawing Sheets

SEAL APPARATUS FOR PRESSURE RESPONSIVE ELECTRICAL SWITCH

CROSS REFERENCES TO RELATED APPLICATIONS

Reference is made to U.S. application Ser. No. 07/913,275 filed Jul, 14, 1992 and assigned to the assignee of the instant invention which discloses and claims a pressure responsive switch having seal means made in accordance with the instant invention.

BACKGROUND OF THE INVENTION

This invention relates generally to seals used with pressure responsive electrical switches and the like and more particularly to O-ring type seals.

In recent years it has become conventional in the automotive art to control various functions by means of microprocessor based controls to obtain performance improvements. In one prior art approach in which solenoid valves are used to effect gear shifting pressure switches placed in communication with hydraulic lines are used to confirm that solenoid valve actuation and de-actuation has occurred by responding to a change in pressure in such lines. An example of a switch of this type is shown and described in U.S. Pat. No. 5,049,708, assigned to the assignee of the present invention. In that patent a normally closed pressure switch comprises upper and lower housings with a snap acting disc mounted on a disc support/terminal member sandwiched therebetween. The lower housing includes a base having a recessed area in which a stationary contact is mounted having an integrally attached terminal extending outwardly beyond the base. The disc support/terminal member has a centrally located opening therethrough with a plurality of contact tabs extending inwardly from the member into the opening in physical and electrical engagement with the outer peripheral portions of the disc. A pressure converter having a flat top surface and a plurality of ribs on its bottom surface extending radially beyond the converter body is slidably received in a centrally disposed bore in the upper housing. The ribs are received in grooves formed in the upper housing to restrict angular movement of the converter and are formed with a recess portion in the center of the converter to provide space for the disc to snap to its opposite, open contacts configuration upon being exposed to a selected pressure level.

A flexible membrane is placed over the centrally disposed bore in the upper housing and an O-ring having a centrally disposed button integrally attached thereto is received on the upper housing with the button received through a centrally disposed bore in the membrane and pressure converter to affix the O-ring, membrane and converter together.

As noted in the above referenced patent, a limitation in prior art switches relates to the fact that the switch contacts are exposed to the working fluids of the transmission. Such fluids contain various contaminants, such as metal shavings from the transmission and insulating pieces both of which can cause problems with switch actuation. Although a filter can be used to exclude gross contaminants various films tend to build-up on the contact and disc surfaces so that it is desirable to provide a high contact force in order to breakthrough the film layers. The structure defined in the patent overcomes that problem by using a pressure converter disposed between the pressure source and the disc resulting in an increase of contact force of two times or more compared to the prior art.

One of the prior art problems that the above referenced patent addressed relates to the O-ring seal used to seal the switch to the pressure source. Pressure responsive switches used with automotive transmissions and particularly microprocessor based engine control modules (ECM) are relatively small and conventional O-rings tend to become dislodged during assembling operations or upon the switches on which the O-rings are mounted being dropped and on occasion are askew or even missing thereby causing leakage problems. Adhesives have sometimes been used to help make sure that once inserted the O-ring members will be permanently retained at their seats; however, this adds to assembly expenses and it is difficult to obtain consistent control of the process. Various other attempts have been made to solve this problem including the provision shown in the referenced patent of the button integrally attached to the O-ring and received through a bore in the membrane and the pressure converter; however, this type of O-ring is significantly more expensive than conventional O-rings and requires extra assembly operations resulting in an undesirable increase in the cost of the switch.

Normally open switches used with the transmission system are typically calibrated to switch from the open position to the closed position upon being exposed to an increase in pressure in the range of approximately 10-30 psi but are subjected to over-pressures of up to 400 psi or even higher which exacerbate any leakage problems.

U.S. Pat. No. 5,015,808, assigned to the assignee of the instant invention, shows another modified O-ring having a neck portion attached to the O-ring and a flange extending outwardly from the neck portion which is adapted to be captured by parts of the switch; however, this also is significantly more expensive than conventional O-rings and requires extra assembly operations. It is therefore an object of the invention to provide a reliable O-ring type seal which is easily assembled and relatively inexpensive. Another object is the provision of an O-ring seal having loose tolerances yet high reliability capable of retention even if the body mounting the seal were to be dropped.

Other objects, features and advantages of the invention will be apparent from the following detailed disclosure taken in conjunction with the accompanying drawings, wherein like reference numerals refer to like parts.

SUMMARY OF THE INVENTION

Briefly, in accordance with the invention, a body member having an aperture in a top surface and an O-ring seat in the form of an upstanding circular wall extending around the aperture and spaced therefrom receives a flexible O-ring having a flat bottom surface received on the seat. An outer surface of the O-ring extends upwardly from the bottom surface which has an upper surface portion proximate to the top of the upstanding wall which is frusto-conical in configuration with the top of the upper surface portion having a smaller diameter than the remainder of the upper surface portion. After the O-ring is put in place the top of the upstanding wall is deformed to move into engagement with the frusto-conical surface portion to capture the O-ring at its seat. According to a feature of the invention, it is preferred to form a lower portion of the outer surface contiguous with the flat bottom surface in a cylindrical configuration so that there will still be an interference fit even with a certain amount of plastic flow of the top wall, over time, back toward its original configuration.

DESCRIPTION OF THE PREFERRED EMBODIMENTS

Figure 1:
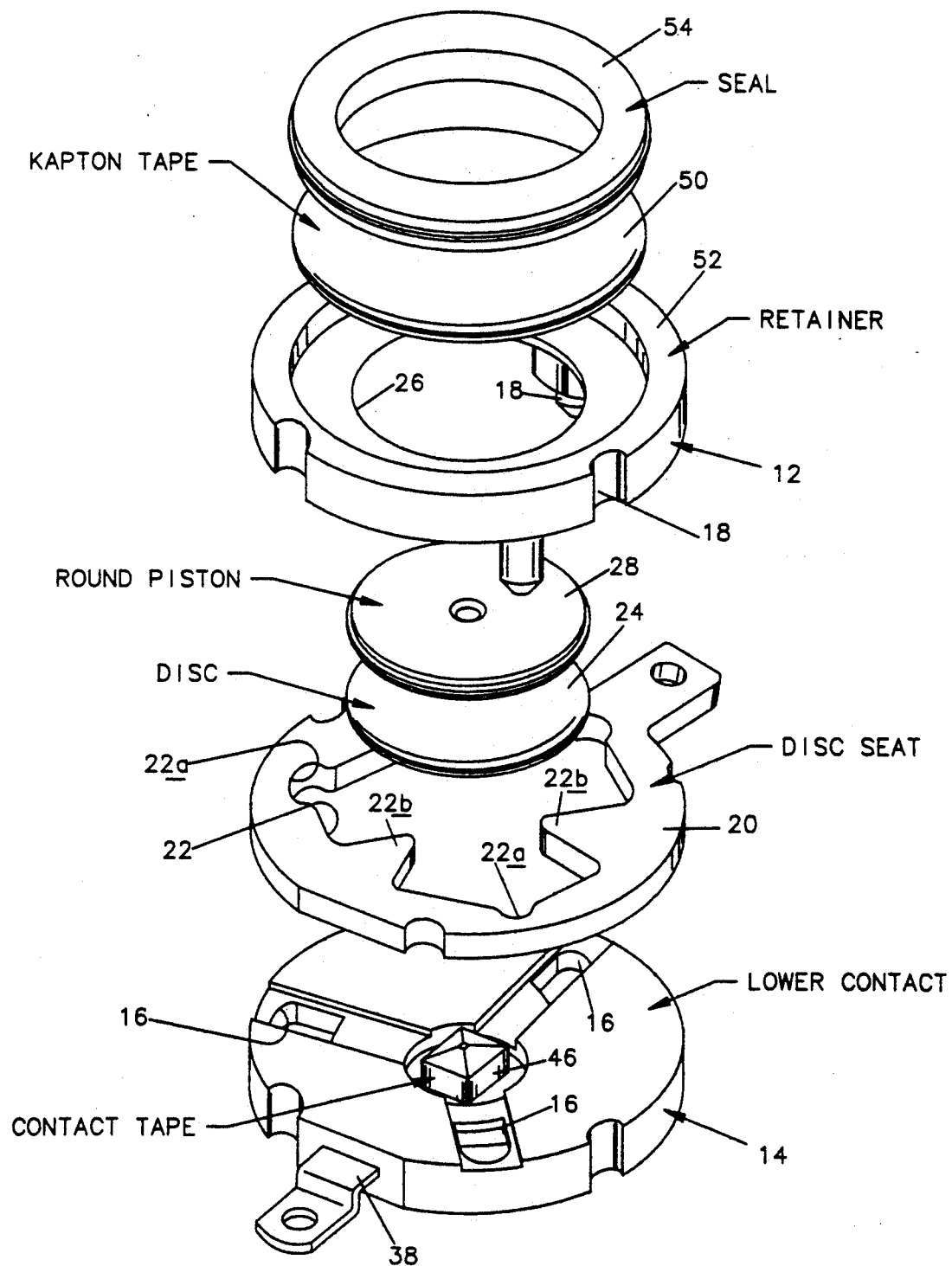
FIG. 1 is an exploded perspective view of a pressure responsive electrical switch having an improved seal made in accordance with the invention.
Figure 2:
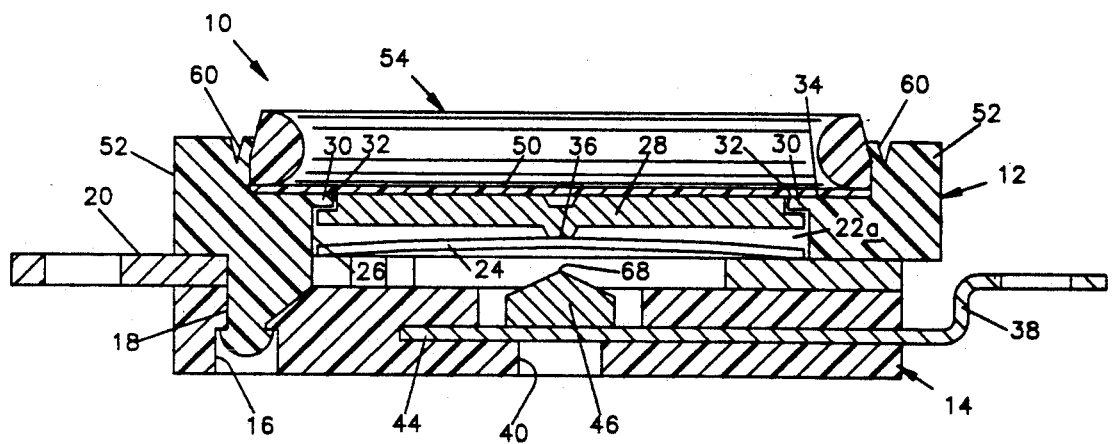
FIG. 2 is a cross sectional view of the assembled switch of FIG. 1.

With particular reference FIGS. 1, 2 numeral 10 designates a normally open, pressure responsive electrical switch having an improved seal made in accordance with the invention. Switch 10 comprises upper and lower body members 12, 14 respectively, formed of suitable electrically insulative material, preferably readily moldable thermoplastic material such as Zytel 70G33HS1L of DuPont de Nemours.

Although the particular configuration is a matter of choice, lower body member 14 is shown to be generally circular in plan view and is formed with a plurality of post receiving apertures 16 adjacent its outer periphery, three being shown; however, the particular number being a matter of choice. Upper body member 12, also generally circular in plan view, has a like number of downwardly depending posts 18 each being received in a respective post receiving aperture 16. A combination terminal member and disc seat 20 having an outer periphery generally matching that of lower body member 14 is sandwiched between body members 12, 14 with posts 18 received through cut-out portions 22a in communication with a centrally disposed aperture 22 formed in member 20. Contact tab portions 22b extend into aperture 22 and serve as a seat for a snap acting disc 24 of electrically conductive material which is placed on member 20 with its normal, at rest convex surface facing upwardly as seen in FIG. 2.

Upper body member 12 is formed with a centrally disposed bore 26 having a diameter selected to accommodate disc 24 and a circular pressure converter 28 having generally the same diameter as the disc and which is adapted to slide along the longitudinal axis of bore 26. A lip 30 is formed on upper body 12 extending radially inwardly into bore 26 to limit outward movement of pressure converter 28 and retain it in bore 26. Pressure converter 28 is preferably provided with an annular recess 32 so that the upper or outer surface of pressure converter 28 is flush with or in alignment with the top surface 34 of upper body member 12 when in the maximum upper or outer position as shown in FIG. 2.

Pressure converter 28 is a rigid plate like member of suitable material, such as aluminum, formed with a centrally disposed projection 36 adapted to engage the central portion of disc 24.

Figure 3:
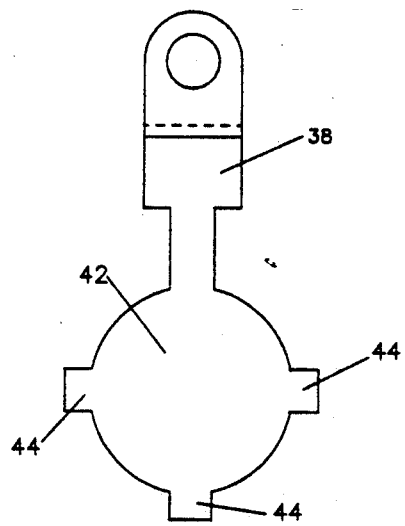
FIG. 3 is a top plan view of the terminal member mounted in the lower body member of the switch shown in FIGS. 1, 2.

Lower body member 14 mounts a second terminal member 38 formed of suitable material such as stainless steel having sufficient thickness, e.g., 0.016–0.014 inches, so that it is rigidly supported in the body member. For example, the terminal can be insert molded into lower body portion 14 and for that purpose an aperture 40 is provided so that the location of the terminal member can be precisely positioned during the molding process. As seen in FIG. 3, terminal 38 has a central area 42 with a plurality of anchoring tabs 44 adapted to be securely held within the body member. An electrical contact 46 is mounted on the terminal as by welding and is formed of suitable material such as a monel clad with an upper gold layer. As seen in FIG. 1, the contact is rectangular in plan view, although if desired it could be circular, having a generally pointed top 48 which is positioned a selected distance below the disc seat 22b so that disc 24, when actuated to its opposite dished configuration can snap through center. This provides a selected contact gap thereby minimizing any effect of particles which might find their way into the area between the disc and the contact. The base of contact 48 preferably covers an area larger than aperture 40 and is aligned therewith to provide a rigid support and ensure that the location of the contact does not change even when the switch is exposed to over-pressures.

Figure 4:
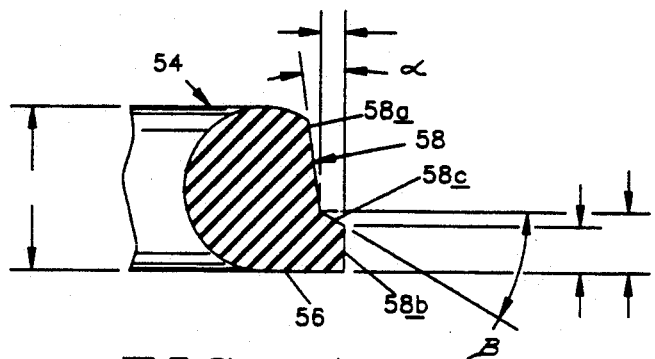
FIG. 4 is a cross sectional, enlarged broken away view of the O-ring member shown in FIGS. 1, 2.

Switch 10 is sealed by placing a thin, flexible membrane 50, such as teflon, on the top surface of the upper body member 12 over bore 26 extending between upstanding wall 52. An O-ring type seal 54 is received on top of membrane 50 on a seat adjacent bore 26 and contiguous with upstanding wall 52. Seal member 54 is formed of a conventional flexible material such as an ethylene acrylic copolymer having a hardness of 75 durometer and, as best seen in FIG. 4, has a bottom flat surface 56 and an outer surface 58 having an upper surface portion 58a which is frusto-conically configured forming an angle $\alpha$ with its longitudinal axis from over 0° to approximately 3°. Preferably a lower surface portion 58b is generally cylindrical in configuration having a size generally conforming to the inside diameter of wall 52. A transitional surface portion 58c which joins the upper and lower surface portions forms an angle $\beta$ with the horizontal of approximately 30°. In a switch made in accordance with the invention, wall 52 has a height of between 0.057 and 0.055 inch while the height of seal member 54 is between 0.076 and 0.070 with the cylindrical surface portion 58c having a height between 0.023 and 0.017 inch so that the upper distal end of wall 52 is aligned with a central portion of surface portion 58a. Seal member 54 is placed on the seal seat and then the top or upper surface of wall 52 is deformed at 60 forcing the upper, inner portion of the wall into an interference fit or gripping engagement with the upper surface portion 58a. Preferably the deformation extends downwardly to a point which is below the center line of the O-ring to increase the compression on the seal and improve the effectiveness of the seal as opposed to conventional undercut seal seats which of necessity extend above the center line of the seal and therefore are limited in the amount that they can compress the seal. This arrangement permits using a seal having a looser than normal tolerance so that automated equipment can easily insert a seal into its proper location and a deforming tool can then cause the seal to be tightly held in place. Although the deformation could be effected at spaced locations about the periphery of wall 52 it is preferred to have a continuous circular deformation. Should elastic flow of wall 52 gradually partially return toward its original shape over time an interference fit will still be formed with the cylindrical surface portion 58b maintaining the seal in its proper location. If desired, the entire surface portion 58 could be frusto-conically configured having a slightly greater angle alpha, up to approximately 10°; however, use of the lower cylindrical surface portion is preferred.

In use, switch 10 is mounted so that seal member 54 is compressed about a pressure port of a housing and when membrane 50 is exposed to sufficient pressure, e.g., 30 psi, the pressure converter 28 will force the center of the disc 24 downwardly as seen in FIG. 2 until it snaps over center and into engagement with point 48 of contact 46 thereby completing a circuit between terminals 20 and 38. As the disc snaps through pressure converter 28 will engage the outer periphery of disc 24 and will be limited by the disc seat portion of terminal 20 as indicated by the dashed lines in FIG. 2 thereby preventing excessive forces from acting on the disc.

It will be understood that a seal made in accordance with the invention can be used with any type of gland requiring an O-ring type seal and that various modifications of the embodiments disclosed are possible within the scope of the invention claimed. It is the intention that the appended claims be interpreted as broadly as possible in view of the prior art to include all such variations and modifications.

We claim:

1. Sealing apparatus comprising
   a body having a top surface being formed with an aperture therein and an O-ring seat in the form of a circular wall extending upwardly from the top surface around the periphery of the aperture and spaced therefrom,
   a flexible O-ring having an outside diameter selected to closely fit within the circular wall received on the O-ring seat,
   the O-ring having a generally flat bottom surface and having a radially outer surface extending from the generally flat bottom surface upwardly a selected distance to an upper distal portion above the circular wall, the upper distal portion having an outer diameter which is less than the outer diameter of the flat bottom surface and at least an upper portion of the radially outer surface proximate to the top of the circular wall being frusto-conical in configuration, said frusto-conical surface portion having a longitudinal axis in which the frusto-conical surface portion forms an angle with the longitudinal axis up to approximately 10°.

2. Seal apparatus according to claim 1 in which a lower portion of the radially outer surface contiguous with the flat bottom surface forms a cylindrical surface which extends upwardly to a point below the top of the circular wall.

3. Seal apparatus according to claim 2 further including a transitional surface extending between the lower portion of the radially outer surface and the upper portion of the radially outer surface.

4. Seal apparatus according to claim 1 in which the top surface of the circular wall is deformed inwardly into engagement with the upper portion of the radially outer surface of the O-ring.

5. Seal apparatus according to claim 4 in which the top surface of the circular wall is deformed continuously around the periphery of the aperture.

6. Seal apparatus comprising a body having a top surface with a selected portion thereon, an O-ring seat comprising a continuous wall spaced from and circumscribing the selected portion and extending around the periphery of the selected portion,
   a flexible O-ring disposed on the O-ring seat, the O-ring having a generally flat bottom surface and having a radially outer surface extending from the generally flat bottom surface upwardly with a lower portion contiguous with the flat bottom surface which forms a cylindrical surface which extends upwardly to a point below the top of the continuous wall, an upper distal portion generally above the continuous wall with a transitional surface portion extending between the lower portion of the radially outer surface and the upper portion of the radially outer surface, at least said upper portion of the radially outer surface proximate to the top of the continuous wall being frusto-conical in configuration, the top wall being deformed into engagement with said at least an upper portion of the radially outer surface to lock the O-ring at its seat.

7. A seal apparatus according to claim 6 in which the top wall is deformed continuously around the periphery of the aperture.

8. Seal apparatus comprising a body having a top surface and an aperture in the top surface, an O-ring seat comprising a continuous wall spaced from the aperture and extending around the periphery of the aperture,
   a flexible O-ring disposed on the O-ring seat, the O-ring having a generally flat bottom surface and having a radially outer surface extending from the generally flat bottom surface upwardly a selected distance to an upper distal portion above the continuous wall, at least an upper portion of the radially outer surface proximate to the top of the continuous wall being frusto-conical in configuration, said upper, frusto-conical surface portion of the O-ring having a longitudinal axis, the upper surface portion forming an angle with the longitudinal axis up to approximately 10°, the top wall being deformed into engagement with said at least an upper portion of the radially outer surface to lock the O-ring at its seat.

9. Seal apparatus comprising a body having a top surface and an aperture in the top surface, an O-ring seat comprising a continuous wall spaced from the aperture and extending around the periphery of the aperture,
   a flexible O-ring disposed on the O-ring seat, the O-ring having a generally flat bottom surface and having a radially outer surface extending from the generally flat bottom surface upwardly a selected distance to an upper distal portion above the continuous wall, at least an upper portion of the radially outer surface proximate to the top of the continuous wall being frusto-conical in configuration, said upper, frusto-conical surface portion of the O-ring having a longitudinal axis, the upper surface portion forming an angle with the longitudinal axis up to approximately 3°, the top wall being deformed into engagement with said at least an upper portion of the radially outer surface to lock the O-ring at its seat.

* * * * *